(12) United States Patent
Hardman

(10) Patent No.: US 7,774,657 B1
(45) Date of Patent: Aug. 10, 2010

(54) AUTOMATICALLY ESTIMATING CORRELATION BETWEEN HARDWARE OR SOFTWARE CHANGES AND PROBLEM EVENTS

(75) Inventor: Daniel H. Hardman, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 703 days.

(21) Appl. No.: 11/238,265

(22) Filed: Sep. 29, 2005

(51) Int. Cl.
*G06F 11/00* (2006.01)

(52) U.S. Cl. .............................. 714/47; 714/48; 714/33; 714/39; 714/57; 707/174

(58) Field of Classification Search .................... 714/47, 714/48, 33, 39, 57; 717/174
See application file for complete search history.

(56) References Cited

U.S. PATENT DOCUMENTS

| | | | | |
|---|---|---|---|---|
| 4,891,767 A * | 1/1990 | Rzasa et al. | ................. | 700/259 |
| 5,191,646 A * | 3/1993 | Naito et al. | ................. | 715/853 |
| 5,408,218 A * | 4/1995 | Svedberg et al. | ............ | 340/507 |
| 5,471,631 A | 11/1995 | Beardsley et al. | | |
| 6,513,141 B1 * | 1/2003 | Livingston | ................. | 714/792 |
| 6,522,250 B1 * | 2/2003 | Ernst et al. | ............... | 340/539.1 |
| 6,604,208 B1 * | 8/2003 | Gosselin et al. | ................ | 714/4 |
| 6,671,818 B1 * | 12/2003 | Mikurak | ........................ | 714/4 |
| 6,694,455 B1 * | 2/2004 | Scrandis et al. | ............... | 714/31 |
| 6,789,257 B1 * | 9/2004 | MacPhail | .................... | 719/316 |
| 6,823,479 B1 * | 11/2004 | McElhaney et al. | ........... | 714/43 |
| 6,947,797 B2 * | 9/2005 | Dean et al. | ..................... | 700/79 |
| 7,047,065 B2 * | 5/2006 | Kalgren et al. | .............. | 600/510 |
| 7,058,560 B1 * | 6/2006 | Arakawa et al. | ............... | 703/22 |
| 7,080,141 B1 * | 7/2006 | Baekelmans et al. | ........ | 709/224 |
| 7,131,037 B1 * | 10/2006 | LeFaive et al. | ................. | 714/46 |
| 7,188,346 B2 | 3/2007 | Martin et al. | | |
| 7,221,987 B2 * | 5/2007 | Bett et al. | .................... | 700/108 |
| 7,251,584 B1 * | 7/2007 | Perazolo et al. | ............. | 702/183 |
| 7,318,178 B2 * | 1/2008 | Steinberg et al. | .............. | 714/47 |
| 7,352,280 B1 * | 4/2008 | Rockwood | ................... | 340/521 |
| 7,363,528 B2 * | 4/2008 | Chan et al. | ..................... | 714/4 |
| 7,401,263 B2 * | 7/2008 | Dubois et al. | ................. | 714/47 |
| 7,546,595 B1 | 6/2009 | Wickham et al. | | |
| 2002/0152185 A1 * | 10/2002 | Satish Jamadagni | ........... | 706/1 |
| 2003/0023722 A1 * | 1/2003 | Vinberg | ...................... | 709/224 |
| 2003/0034888 A1 * | 2/2003 | Ernst et al. | ................... | 340/540 |
| 2003/0097588 A1 * | 5/2003 | Fischman et al. | ........... | 713/200 |
| 2004/0167976 A1 * | 8/2004 | Peer | ........................... | 709/223 |

(Continued)

OTHER PUBLICATIONS

U.S. Appl. No. 11/282,791, filed Nov. 18, 2005, Hardman, Daniel H.

(Continued)

*Primary Examiner*—Joshua Lohn
*Assistant Examiner*—Loan Truong
(74) *Attorney, Agent, or Firm*—Advantedge Law Group

(57) ABSTRACT

Automated estimation that a hardware or software change is correlated with one or more problem events. In addition to identifying that a change has occurred, one or more problem events are identified that have occurred after the change. Problem events are then correlated with the change using a distance measure between the change and the at least one correlated problem event. For most, if not all, of the distance measure, the greater the distance measure, the less the change is correlated with each correlated problem event. The distance measure may be a time interval, an activity-weighted interval, or any other type of distance measure.

20 Claims, 4 Drawing Sheets

U.S. PATENT DOCUMENTS

| | | | |
|---|---|---|---|
| 2004/0168100 A1* | 8/2004 | Thottan et al. | 714/4 |
| 2004/0230873 A1* | 11/2004 | Ward | 714/39 |
| 2005/0137832 A1* | 6/2005 | Yemini et al. | 702/183 |
| 2005/0155031 A1* | 7/2005 | Wang et al. | 717/170 |
| 2005/0183066 A1* | 8/2005 | Jabori | 717/124 |
| 2006/0025984 A1* | 2/2006 | Papaefstathiou et al. | 703/22 |
| 2006/0031691 A1* | 2/2006 | Bacchus et al. | 713/300 |
| 2006/0080656 A1 | 4/2006 | Cain et al. | |
| 2006/0224544 A1 | 10/2006 | Keith, Jr. | |
| 2006/0253553 A1* | 11/2006 | Burckart et al. | 709/220 |
| 2006/0288149 A1* | 12/2006 | LaVigne et al. | 710/306 |

OTHER PUBLICATIONS

Non-Final Office Action received in U.S. Appl. No. 11/282,791; Feb. 23, 2009.

Final Office Action received in U.S. Appl. No. 11/282,791; Aug. 20, 2009.

Non-Final Office Action recieved in related U.S. Appl. No. 11/282,791; Dec. 18, 2009.

* cited by examiner

AUTOMATICALLY ESTIMATING CORRELATION BETWEEN HARDWARE OR SOFTWARE CHANGES AND PROBLEM EVENTS

BACKGROUND OF THE INVENTION

Computing technology has revolutionized the way that we work, play, and communicate. Computing systems consist of interacting hardware and software. As far as hardware, computing systems are increasing taking a wide variety of physical forms including desktop computers, laptop computers, Personal Digital Assistants (PDAs), mobile phones, and even many devices (such as refrigerators) that have not conventionally been integrated with computing technology. Computing systems may even be networked together to form a distributed computing system. Thus, a computing system may technically be distributed throughout the globe, or may be small enough to fit in the palm of one's hand. Regardless of its physical form, a computing system often includes one or more processors, memory, and persistent storage.

On the other hand, software is a collection of computer-executable instructions and associated data that may be executed and used by the processor(s) to direct the computing system to perform in particular ways. Currently, there is a wide variety of software available for a wide variety of computing platforms. Accordingly, general purpose computing systems in particular may perform a wide variety of functionality.

A common way of changing the functionality of a computing system is to impose a hardware or software change on the computing system. A hardware change may include, for example, the installation of more memory, a new hard drive, another processor, external devices, or the like. A software change may include, for example, the installation or upgrade of new software. For instance, the installation or upgrade of a software application, operating system, or other software component would cause a functional change in the computing system. The installation of patches and services packs, for example, is an example of a software change as well.

Regardless of the type of hardware or software change, it is often quite difficult if not impossible, to predict beforehand the full effect of imposing a change in a particular environment. This is particularly true if the change and/or the deployment environment is complex. Conventionally, Information Technology (IT) professionals typically deploy a software change, for example, on a test machine and observe the subsequent behavior of the machine to form an opinion about the change's stability and compatibility with their production environment. If the change seems to have no adverse effects, the software change may eventually rolled out to the actual computing system or computing systems that are to have the change. If problems occur after the rollout, the rollout may typically be reversed.

The assessment process prior to rolling out a software change may be quite extensive and require significant human intervention and judgment as to the performance of the software change. Furthermore, the assessment period delays the overall rollout of the software change, and may not ultimately be a correct assessment since instability may be caused by non-obvious factors that may differ from one computing system to another.

There are conventional test suites that automatically test a software change prior to rollout. However, these conventional test suites typically provide only a success or failure decision, with little more information regarding the performance and stability of the software change. Accordingly, what would be advantageous is a mechanism that allows the stability of a hardware or software change to be assessed in a more automated and detailed fashion.

BRIEF SUMMARY OF THE INVENTION

The foregoing problems with the prior state of the art are overcome by the principles of the present invention, which are directed towards automated estimation regarding whether a hardware or software change is correlated with one or more problem events. In addition to identifying that a change has occurred, one or more problem events proximate to the change are identified. Problem events are then correlated with the software change using a distance measure between the software change and the problem event. The distance measure provides valuable information regarding whether the change is correlated to the problem event.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to the automated estimation of a correlation level between a hardware or software change and problem events. First, a general computing system will be described with respect to FIG. 1, as being a suitable computing system that may be used to practice the principles of the present invention. Then, the principles of the present invention will be described with respect to FIGS. 2 through 4.

Figure 1:
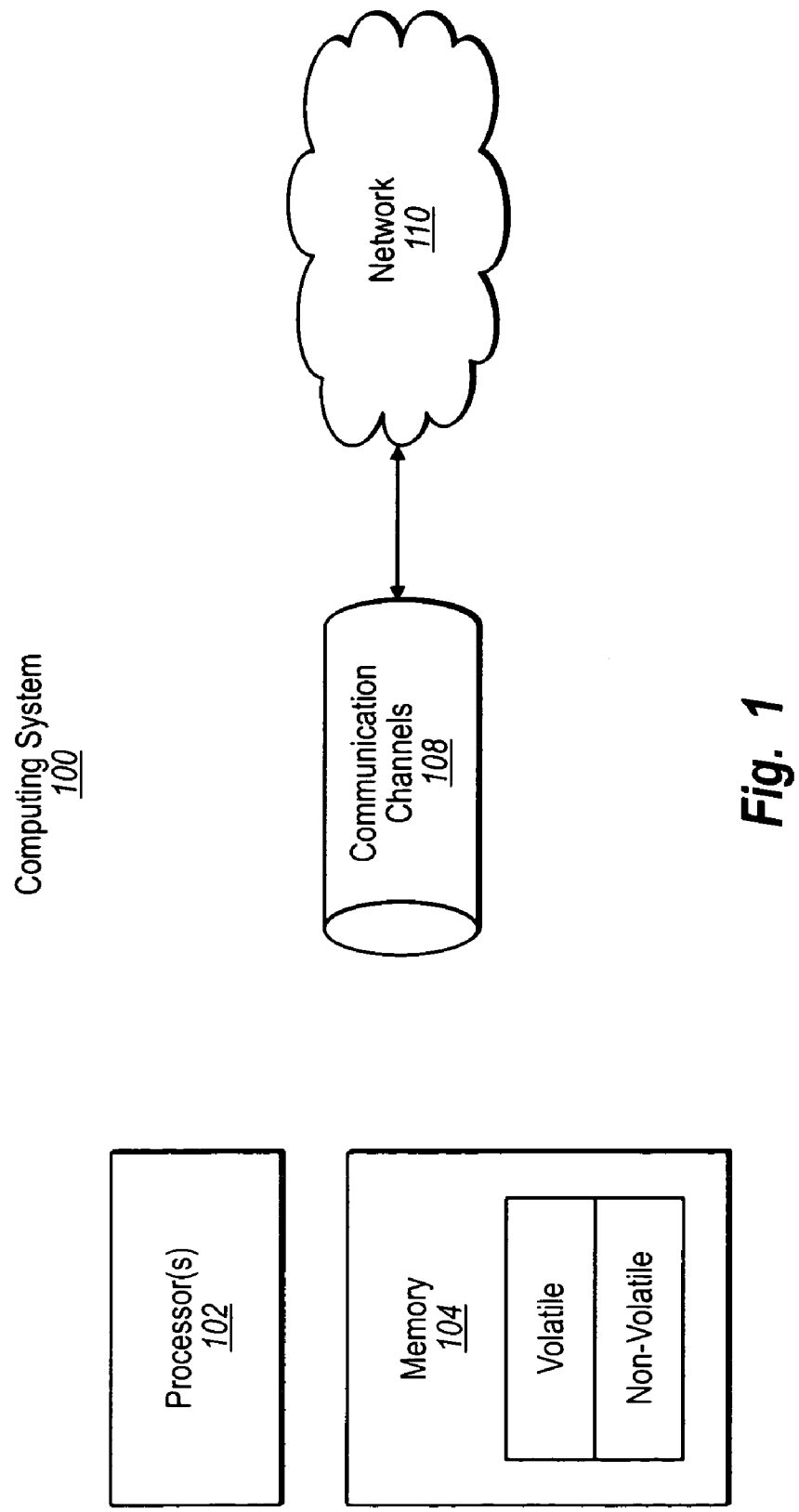
FIG. 1 illustrates a computing system that may be used to implement features of the present invention.

FIG. 1 shows a schematic diagram of an example computing system 100 that may be used to implement features of the present. invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, .or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
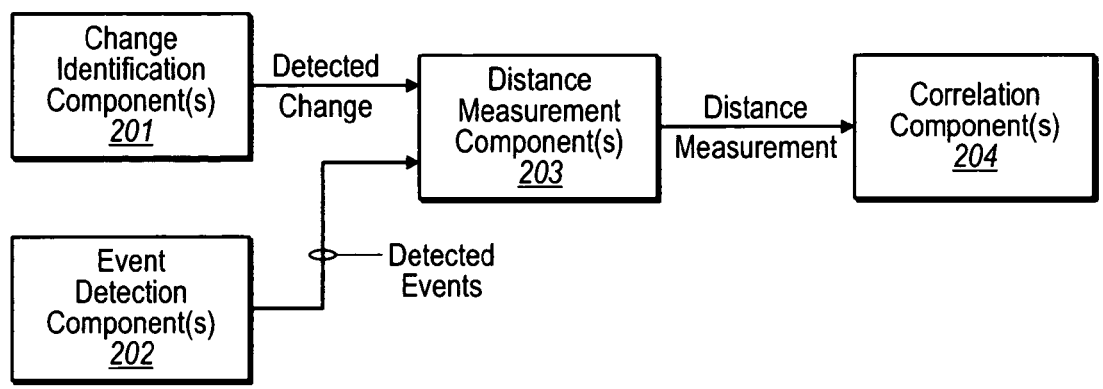
FIG. 2 illustrates a system that automatically estimates whether a hardware or software change is correlated with one or more problem events in accordance with the principles of the present invention.

FIG. 2 illustrates a system 200 for automatically estimating correlation between a hardware or software change and problem events in accordance with the principles of the present invention. The system 200 includes change identification component(s) 201 that identify when hardware or software changes occur. For instance, during the installation of a new hardware device, the operating system registry may log the installation of new hardware. During the installation of a software update, an installation manager may log what software application and/or component was installed, and when. The time of the change may also be entered by an individual who initiated the hardware or software change. A software change may be the installation of a new software program or component, the upgrading of an existing software program or component, or perhaps even just the changing of configuration settings of an existing software program or component.

The system 200 also includes event detection component (s) 202 that identify problem events that have occurred on a computing system. Indicators of problem events may be monitored through a service or daemon that passively observes on a low-priority background thread. While not required, the service or daemon notices problem events of potentially a variety of event categories including (but not limited to) application crashes, uninstalls, blue screens of death (BSOD), reboots, system recovery point accesses or rollbacks, anomalous usage of storage or network, actions of a behavior blocking engine, performance degradation, and others. However, the principles of the present invention may also be useful even if events of only one event category (e.g., BSODs) are noticed.

The system also includes a distance measurement generation component(s) 203. The distance measure may be a strict time interval between the time that the change occurred and the time that the problem event occurred. In another embodiment, the distance measure is weighted by one or more performance counters such as Central Processing Unit (CPU) usage, disk and/or network I/O, process launches, and so forth, and to multiply the raw percentage utilization of these resources by elapsed time. In a simple case, for example, activity units could be defined in terms of "CPU minutes". For instance, if fifteen minutes elapse with an average of ten percent CPU utilization, then 1.5 activity units have elapsed.

A still more sophisticated algorithm could map multiple factors to activity units simultaneously. For example, perhaps 5 disk reads and a process creation equals as much activity as 7 network accesses and 30 CPU seconds. The ratios and weightings of multiple factors could be determined empirically by summing up average historical activity for a given machine or environment. Using activity-based measures of elapsed units rather than simple time is advantageous because many stability issues are not manifest when a system is idle. Accordingly, activity-based measures of elapsed time may be more accurately correlated to stability issues than a strict time measure.

The system 200 also includes correlation component(s) 204 that correlate at least one problems event detected by the event detection component(s) with a hardware or software change identified by the change identification component(s) 201. The correlation may be based on the distance measure generated by the distance measure generation an component (s) 203. For instance, the correlation components may take the distance measure for each problem event of interest, and transform the distance measure into a correlation coefficient that quantifies the relationship between problem events and a corresponding hardware and/or changes.

A correlation coefficient may be generated for each problem event and change combination. In one embodiment, the correlation is weighted to be sequence-dependent and also dependent on the elapsed time or elapsed activity-weighted time. An example of a weighting function for problem events detected after the hardware or software change may be a hyperbolic function such as $y=k*(x+k)^{-1}$ or $y=k*(x+k)^{-0.5}$, where k is an arbitrary constant, x is the elapsed time (strict time or activity-weighted time) from the time that the change occurred and the time that the problem event occurred, and y is the correlation coefficient. The equations could be refined or derived empirically based on how successful they were in correlating changes to problem events known to be caused by that change.

Although problem events that occur after a change may be indicative of a correlation between the change and the problem event, there is an alternative explanation for the problem event. Perhaps the problem event was simply a continuation of a problem that existed prior to the hardware or software change. In that case, the existence of problem events of a particular type prior to the change may partially or totally offset the significance of problem events of that same type that occur after the change. Thus, in one embodiment of the present invention, pre-existing problem events tend to have a subtractive effect on any correlation implied by problem events that occurred after the change.

For instance, if a problem event occurred at all or within a certain time period prior to a hardware change, then problem events (e.g., of any type or perhaps just of the same type as the pre-existing problem event) that occurred after the change will be assumed to be uncorrelated to the change. Alternatively, the pre-existing problem event may only partially offset the correlation implied by problem events (e.g., of any type or perhaps just of the same type as the pre-existing problem event) that occurred after the change in a scaled fashion. For instance, problem events that immediately precede a particular change may be deemed unrelated to the change, but problem events that have not occurred for a long time prior to the change but then recur soon after the change could still be moderately correlated.

In addition to detecting when a hardware or software changes causes a problem event, the principles of the present invention may also be used to detect when the hardware or software change fixes certain problem events (i.e., has a negative correlation with a problem event). For instance, suppose that a computing system regularly experienced Blue Screen of Death (BSOD) failures prior to a hardware or software change. Then, after the change, there are no further BSOD failures. This would be a strong indication that the change actually fixed the BSOD problems.

Figure 3:
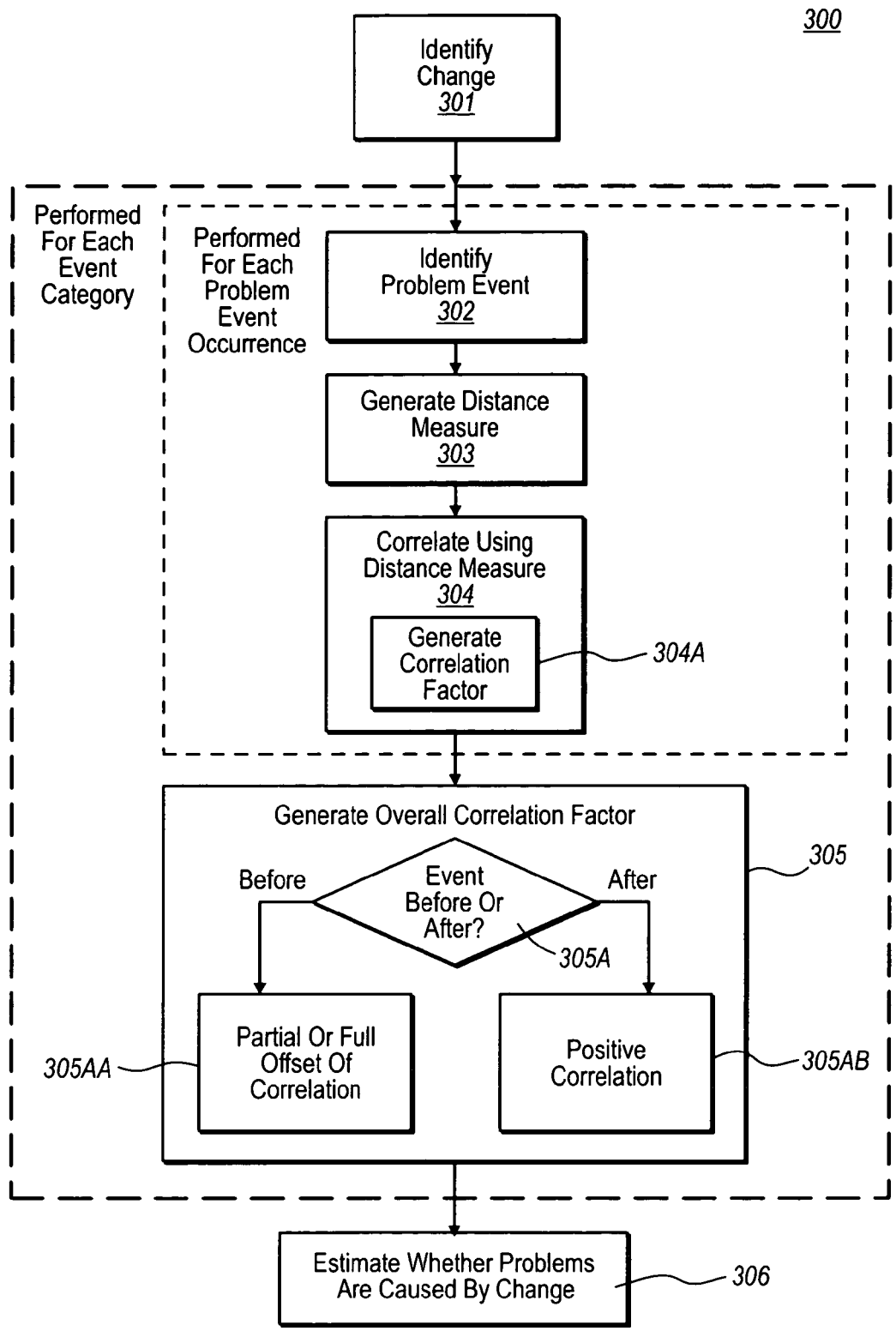
FIG. 3 illustrates a flowchart of a method for automatically estimating whether a hardware or software change is correlated with one or more problem events in accordance with the principle of the present invention.

FIG. 3 illustrates a flowchart of a computer-implemented method 300 for estimating that a software change is correlated with one or more problem events. The computing system first detects that a hardware or software change has occurred (act 301). This may be performed by the change identification component(s) 201 of FIG. 2. Acts 302 through 305 are then performed for each event category (from one to unlimited), where an event category may range from being as broadly defined as "all events" to being very narrowly defined such as "only Blue Screen of Deaths (BSODs) caused by a given exception code". Even more narrow categories of categories of different scope may be defined. One example of a moderate scope category is "all BSODs" in which all BSOD events are treated as one category, for example, rather than treating each exception code in a BSOD as a separate type of problem. The acts 302 through 305 may be performed in parallel and/or sequentially for each event category. Acts 302 through 304 are performed for each problem event within a particular event category, and may be performed in parallel and/or sequentially for each problem event within an event category.

The hardware and software change may often take place on the same computing system in which the problem events occur. However, sometimes hardware or software changes on one computing system may cause problem events in others. The principles of the present may be used to automatically estimate correlations between hardware or software changes on one computing system, and problem events on another computing system. Accordingly, the identification of a hardware or software change may be in the form of a message from another computing system that a hardware or software change has occurred. If there is the possibility of a substantial delay between the computing system being changed and the computing system being monitored, then the message might also include a time indicator showing the time of the change. Alternatively, a user who is aware of the time of the hardware or software change on the other computing system may enter the time of the change on the computing system being monitored for problems.

Regardless of whether the change occurred on a remote computing system, or on the same computing system as the system that is being monitored for problems, problem events are identified (act 302). This may be performed by the event detection component(s) 202 of FIG. 2.

The distance measure is then generated (act 303) for at least some of the problem events. In one embodiment, each computing system being monitored may build a data structure representing timeline that shows the time of the hardware or software change, and the time of the problem event, where the time of the problem event may be real time or may be weighted by one or more computing activities as mentioned above. The timeline may represent a finite time span (referring to herein as the "relevance window") including a finite amount of time before the change, and a finite amount of time after the change.

Figure 4:
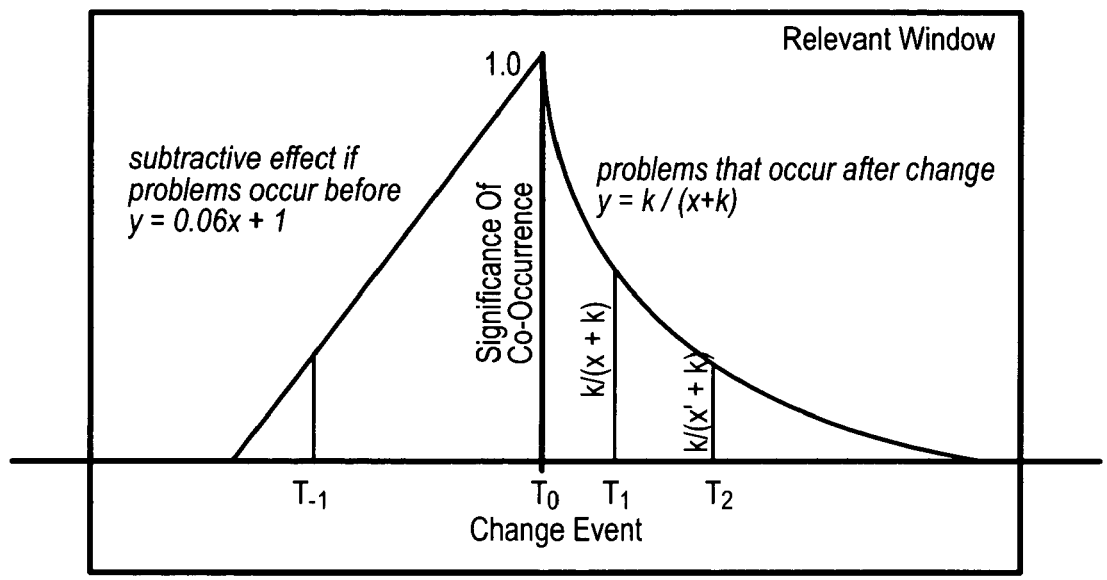
FIG. 4 illustrates a chart showing how problem events that occur before or after a hardware or software change may be correlated with that change.

The computing system then correlates the problem events with the software change using the distance measures (act 304). For instance, FIG. 4 shows a timeline 400 within a relevance window. The timeline 400 shows the change occurring at time $T_0$. Two problem events occurred after the change at times $T_1$ and $T_2$. A similar problem of the same event category occurred before the change at time $T_{-1}$.

The correlation of a problem event to a particular change may be accomplished by the generation of a correlation factor for each problem event/change combination (act 304A). For instance, FIG. 4 illustrates the timeline 400 in the context of a correlation function. The correlation function may be used to define the correlation factor for a problem event/change combination. The illustrated correlation function is as defined as follows in equation 1:

If $-16.67 < x < 0$, then $y = 0.06*x + 1$; and

If $x > 0$, then $y = k/(x+k)$, (1)

where x is the time (e.g., activity-weighted time) between the time of the change and the time of the problem event (positive if the event occurred after the change, and negative if the event occurred before the change), where k is some arbitrary constant; and where y is the correlation coefficient for the problem event/change pair.

Using this correlation function, the closer in time (e.g., real time or activity time) a problem event occurs after the change, the more correlation is assigned to the pair. On the other hand, the more recent a problem event occurred before a change, the most subtractive effect that prior event will have on correlation of problem events of that same event category on the subsequent change. The principles of the present invention are not limited to this correlation function by any means. Furthermore, different problem event categories may have different correlation functions. The correlation function may also change over time, as more is learned about the nature of the change and problem event.

After generating a correlation factor for each problem event for the change, an overall correlation factor for problem events of that event category and the change is estimated (act 305). If the problem event happened after the change ("After" in decision block 305A), then there is a positive contribution to the overall possibility of a correlation of problem events of that same event category to the change (represented by block 305AB). If, on the other hand, the problem event happened before the change ("Before" in decision block 305A), then there is a negative contribution to the overall possibility of a correlation of problem events of that same event category to the change (represented by block 305AA).

For example, suppose that the timeline 400 represents problem events of all BSODs. Suppose further that the given change is followed by a BSOD at x=3 activity units (e.g., strict or activity weighted time) and a BSOD at x=8 activity units. Suppose further that the arbitrary constant "k" is 2 activity units. Given the correlation function of $k/(x+k)$, the first BSOD has a correlation factor of $2/(3+1)$ or ½ or 0.500, and the second BSOD has a correlation factor of $(2/8+1)$ or 2/9 or 0.222. Positive contribution may be obtained from both correlation factors by simply summing the correlation factors together to obtain a preliminary overall correlation factor of 0.722.

Then, the subtractive effect represented by problem events that occurred in the past may be quantified. In one embodiment, if a problem event of a given event category preceded the change within a given time window, then any correlation inferred by problem events of that same category that occurred after the change may be cancelled. In FIG. 4, however, partial offsetting may instead be performed. For example, if a BSOD occurred 12 activity units before the change as well as at 3 and 8 units after, then the correlation function may be used with equal to minus twelve (−12) to get a subtractive effect of $0.06(-12)+1=0.28$, and a net correlation score for BSODs against this change of $0.722-0.28=0.442$.

The positive sign of the correlation factor indicates that the change has a tendency to cause the problem events of that event category. If the correction factor had been negative, this would indicate that the change has a tendency to fix the problem event of that event category. For instance, suppose in FIG. 4, that the problem events did not occur after the change at all. Within the relevance window, there was only the occurrence of the problem event at time $T_{-1}$. Assuming $T_{-1}=-12$, this would result in a net correlation score for the BSODs of −0.28, indicating that the change had a slight tendency to fix the problem.

Ordinary statistical techniques may be used at this stage to test the null hypothesis that there is no association between the change and each particular problem type, or, alternatively, to generate a correlation coefficient between each problem type and the analyzed change, across a larger sample. For instance, perhaps the overall correlation score for a given event type is calculated on multiple computing systems that had been subjected to the same change. The correlation scores for each computing system may be used to calculate an overall correlation implied across the entire environment of multiple computing systems.

The correlation scores may be generated for multiple event categories. This may be used to estimate an overall possibility that the software change is causing problems that occurred after the software change (act 306). For instance, a change may not cause many BSODs, but may cause some moderate amount of uninstalls and reboots. The resulting correlation scores may be evaluated together to allow the computing system to estimate whether or not the change has caused problems given all of the results from all of the event categories.

Accordingly, the principles of the present invention provide an efficient and automated mechanism for estimating whether or not a hardware or software change causes problems, whether those problems be on the same computing system as the change or whether the problems be on a remote computing system. Since the estimation is automated, the output is reproducible and concrete, allowing for remedial action to be taken in a disciplined, policy-driven fashion, and allowing the change to be deployed in an environment similar to the one where stability was evaluated, with confidence in its likely effect.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for estimating that a hardware or software change is correlated with one or more problem events, the method comprising:

identifying that a hardware or software change has occurred;

identifying one or more problem events that have occurred before and/or after the hardware or software change has occurred;

correlating at least one of the one or more problem events with the hardware or software change using a distance measure between the hardware or software change and the at least one correlated problem event, wherein the distance measure comprises an activity-weighted interval that is weighted using at least one computing-activity-performance metric; and making a positive or negative contribution to an overall possibility of a correlation of a category of problem events to the hardware or software change, wherein whether the contribution is positive or negative depends on whether the one or more problem events occurred before or after the hardware or software change, so that the contribution is positive if the one or more problem events occurred after the hardware or software change, and the contribution is negative if the one or more problem events occurred before the hardware or software change.

2. A computer-implemented method in accordance with claim 1, wherein for most of the distance measure, the greater the distance measure, the less the software change is correlated with each correlated problem event.

3. A computer-implemented method for estimating that a hardware or software change is correlated with one or more problem events in accordance with claim 1, wherein the distance measure comprises a time interval between the hardware or software change and at least one of the correlated problem events.

4. A computer-implemented method for estimating that a hardware or software change is correlated with one or more problem events in accordance with claim 1, wherein the at least one computing-activity-performance metric measures at least one of the following:
  central processing unit cycles;
  file access I/O volume;
  network I/O volume;
  connection request volume; and
  process launch volume.

5. A computer-implemented method for estimating that a hardware or software change is correlated with one or more problem events in accordance with claim 1, wherein the one or more problem events comprises at least a first and second problem event, wherein correlating at least one of the one or more problems events with the hardware or software change using a distance measure between the hardware or software change and the at least one correlated problem event comprises the following:
  generating a first correlation factor using a first distance measure between the hardware or software change and the first problem event;
  generating a second correlation factor using a second distance measure between the hardware or software change and the second problem event; and
  generating the overall possibility of correlation based on the first and second correlation factors.

6. A computer-implemented method for estimating that a hardware or software change is correlated with one or more problem events in accordance with claim 1, the method further comprising:
  estimating the possibility that the hardware or software change is associated with the one or more problem events.

7. A computer-implemented method for estimating that a hardware or software change is correlated with one or more problem events in accordance with claim 6, further comprising:
  identifying one or more pre-existing problem events that have occurred before the hardware or software change has occurred; and
  correlating at least one of the one or more pre-existing problems events with the hardware or software change using a distance measure between the hardware or software change and the at least one correlated pre-existing problem event,
  wherein a correlation between a pre-existing problem and the hardware or software change has a tendency to reduce the estimated possibility that the hardware or software change is associated with the one or more problem events.

8. A computer-implemented method for estimating that a hardware or software change is correlated with one or more problem events in accordance with claim 1, wherein the one or more problem events are all of the same first category of problem events, the method further comprising:
  identifying one or more problem events of a second category that have occurred before and/or after the hardware or software change has occurred, wherein the second category is different than the first category;
  correlating at least one of the one or more problems events of the second category with the hardware or software change using a distance measure between the hardware or software change and the at least one correlated problem event of the second category, wherein for most of the distance measure, the greater the distance measure, the less the hardware or software change is correlated with each correlated problem event; and
  estimating the possibility that the hardware or software change is causing problems that occurred after the hardware or software change based on results obtained from correlating at least one of the one or more problem events of the first category and based on results obtained from correlating at least one of the one or more problem events of the second category.

9. A computer program product comprising one or more computer-readable storage media having thereon computer-executable instructions that, when executed by one or more processors of a computing system, cause the computing system to perform a method for estimating that a hardware or software change is correlated with one or more problem events, the method comprising:
  identifying that a hardware or software change has occurred;
  identifying one or more problem events that have occurred before and/or after the hardware or software change has occurred;
  correlating at least one of the one or more problems events with the hardware or software change using a distance measure between the hardware or software change and the at least one correlated problem event, wherein the distance measure comprises an activity-weighted interval that is weighted using at least one computing-activity-performance metric; and
  making a positive or negative contribution to an overall possibility of a correlation of a category of problem events to the hardware or software change, wherein whether the contribution is positive or negative depends on whether the one or more problem events occurred before or after the hardware or software change, so that the contribution is positive if the one or more problem events occurred after the hardware or software change, and the contribution is negative if the one or more problem events occurred before the hardware or software change.

10. A computer program product in accordance with claim 9, wherein the distance measure comprises a time interval between the hardware or software change and at least one of the correlated problem events.

11. A computer program product in accordance with claim 9, wherein the one or more problem events comprises at least a first and second problem event, wherein correlating at least one of the one or more problem events with the hardware or software change using a distance measure between the hardware or software change and the at least one correlated problem event comprises the following:
  generating a first correlation factor using a first distance measure between the hardware or software change and the first problem event;
  generating a second correlation factor using a second distance measure between the hardware or software change and the second problem event; and
  generating the overall possibility of correlation based on the first and second correlation factors.

12. A computer program product in accordance with claim 9, the method further comprising:
  estimating the possibility that the hardware or software change is associated with the one or more problem events that occurred after the hardware or software change.

13. A computer program product in accordance with claim 9, wherein the method further comprises:

identifying one or more pre-existing problem events that have occurred before the hardware or software change has occurred; and correlating at least one of the one or more pre-existing problems events with the hardware or software change using a distance measure between the hardware or software change and the at least one correlated pre-existing problem event, wherein a correlation between a pre-existing problem and the hardware or software change has a tendency to reduce the estimated possibility that the hardware or software change is associated with the one or more problem events.

14. A computer program product in accordance with claim 9, wherein the one or more problem events are all of the same first category of problem events, the method further comprising:

identifying one or more problem events of a second category that have occurred after the hardware or software change has occurred, wherein the second category is different than the first category;

correlating at least one of the one or more problems events of the second category with the hardware or software change using a distance measure between the hardware or software change and the at least one correlated problem event of the second category; and estimating the possibility that the hardware or software change is causing problems that occurred after the hardware or software change based on results obtained from correlating at least one of the one or more problem events of the first category and based on results obtained from correlating at least one of the one or more problem events of the second category.

15. A computing system comprising one or more processors;

one or more computer-readable storage media having thereon computer-executable instructions that, when executed by the one or more processors, cause the computing system to:

identify that a hardware or software change has occurred;

identify one or more problem events that have occurred before and/or after the hardware or software change has occurred;

correlate at least one of the one or more problem events with the hardware or software change using a distance measure between the hardware software change and the at least one correlated problem event, wherein the distance measure comprises an activity-weighted interval that is weighted using at least one computing-activity-performance metric; and make a positive or negative contribution to an overall possibility of a correlation of a category of problem events to the hardware or software change, wherein whether the contribution is positive or negative depends on whether the one or more problem events occurred before or after the hardware or software change, so that the contribution is positive if the one or more problem events occurred after the hardware or software change, and the contribution is negative if the one or more problem events occurred before the hardware or software change.

16. One or more computer-readable storage media having thereon the following:

one or more hardware or software change identification components that identify when hardware or software changes have occurred;

one or more event detection components that identify problem events that have occurred on a computing system;

one or more correlation components that correlate at least one problem event detected by the one or more event detection components with a hardware or software change identified by the one or more hardware or software change identification components using a distance measure between the hardware or software change and the at least one correlated problem event, wherein the distance measure comprises an activity-weighted interval that is weighted using at least one computing-activity-performance metric; and one or more contribution components that make a positive or negative contribution to an overall possibility of a correlation of a category of problem events to the hardware or software change, wherein whether the contribution is positive or negative depends on whether the one or more problem events occurred before or after the hardware or software change, so that the contribution is positive if the one or more problem events occurred after the hardware or software change, and the contribution is negative if the one or more problem events occurred before the hardware or software change.

17. A computer-implemented method comprising:

identifying that a hardware or software change has occurred in a first computing system;

identifying one or more problem events that have occurred before and/or after the hardware or software change has occurred in a second computing system that is communicatively coupled to the first computing system;

correlating at least one of the one or more problem events in the second computing system with the hardware or software change in the first computing system using a distance measure between the hardware or software change and the at least one correlated problem event, wherein the distance measure comprises an activity-weighted interval that is weighted using at least one computing-activity-performance metric; and making a positive or negative contribution to an overall possibility of a correlation of a category of problem events to the hardware or software change, wherein whether the contribution is positive or negative depends on whether the one or more problem events occurred before or after the hardware or software change, so that the contribution is positive if the one or more problem events occurred after the hardware or software change, and the contribution is negative if the one or more problem events occurred before the hardware or software change.

18. A computer-implemented method in accordance with claim 17, wherein the first computing system is a server and the second computing system is a client of the server.

19. A computer-implemented method in accordance with claim 17, wherein for most of the distance measure, the greater the distance measure, the less the software change is correlated with each correlated problem event.

20. A computer-implemented method in accordance with claim 17, wherein the distance measure comprises a time interval between the hardware or software change and at least one of the correlated problem events.

* * * * *